US012254784B2

(12) United States Patent
Liu et al.

(10) Patent No.: US 12,254,784 B2
(45) Date of Patent: Mar. 18, 2025

(54) EMOTIONAL EVOLUTION METHOD AND TERMINAL FOR VIRTUAL AVATAR IN EDUCATIONAL METAVERSE

(71) Applicants: Fujian TQ Digital Inc., Fuzhou (CN); Central China Normal University, Wuhan (CN)

(72) Inventors: Dejian Liu, Fuzhou (CN); Yan Ge, Fuzhou (CN); Jing Peng, Wuhan (CN); Zheng Zhong, Wuhan (CN); Jian Xu, Wuhan (CN)

(73) Assignees: Fujian TQ Digital Inc, Fuzhou (CN); Central China Normal University, Wuhan (CN)

( * ) Notice: Subject to any disclaimer, the term of this patent is extended or adjusted under 35 U.S.C. 154(b) by 0 days.

(21) Appl. No.: 18/475,569

(22) Filed: Sep. 27, 2023

(65) Prior Publication Data

US 2025/0014470 A1 Jan. 9, 2025

(30) Foreign Application Priority Data

Jul. 5, 2023 (CN) .......................... 202310815919.5

(51) Int. Cl.
*G09B 5/06* (2006.01)
*G06T 13/40* (2011.01)
*G06V 40/16* (2022.01)

(52) U.S. Cl.
CPC .............. *G09B 5/065* (2013.01); *G06T 13/40* (2013.01); *G06V 40/176* (2022.01)

(58) Field of Classification Search
CPC ....... G09B 5/065; G06T 13/40; G06V 40/176
USPC ......................................................... 434/322
See application file for complete search history.

(56) References Cited

U.S. PATENT DOCUMENTS

| 2007/0074114 A1* | 3/2007 | Adjali ...................... G06F 3/01 715/706 |
| 2008/0151786 A1* | 6/2008 | Li .......................... H04N 7/142 370/276 |
| 2017/0178287 A1* | 6/2017 | Anderson ................ G06T 11/00 |
| 2021/0142516 A1* | 5/2021 | Ma ........................ G06T 19/006 |

(Continued)

*Primary Examiner* — Robert P Bullington, Esq.
*Assistant Examiner* — Stephen Alvesteffer
(74) *Attorney, Agent, or Firm* — Stein IP LLC

(57) ABSTRACT

Disclosed are an emotional evolution method and terminal for a virtual avatar in educational metaverse. By collecting expression data and audio data of the virtual avatar, and performing emotional feature extraction based on the expression data and the audio data; fusing an extracted sound emotional feature with an extracted expression emotional feature by using an emotional feature fusion model, and performing emotion recognition on a multi-modal emotional feature fusion result obtained by fusion to obtain an emotional category corresponding to the multi-modal emotional feature fusion result; labeling the multi-modal emotional feature fusion result based on a semantic vector of the emotional category to generate an emotional evolution sequence; and driving the virtual avatar to perform emotional expression according to a target emotional evolution pattern extracted from the emotional evolution sequence, a unified and united multi-modal emotional feature fusion result is formed, the emotional self-evolution of the virtual avatar is achieved.

8 Claims, 14 Drawing Sheets

(56) References Cited

U.S. PATENT DOCUMENTS

2022/0277505 A1* 9/2022 Baszucki ................ G06T 13/40
2022/0368856 A1* 11/2022 Choi ...................... H04N 7/157

* cited by examiner

S1.Collecting expression data and audio data of the virtual avatar, and performing emotional feature extraction based on the expression data and the audio data to obtain a sound emotional feature and an expression emotional feature

S2.Fusing the sound emotional feature with the expression emotional feature by using an emotional feature fusion model to obtain a multi-modal emotional feature fusion result, and performing emotion recognition on the multi-modal emotional feature fusion result to obtain an emotional category corresponding to the multi-modal emotional feature fusion result

S3.Determining a semantic vector of the emotional category, and labeling the multi-modal emotional feature fusion result based on the semantic vector of the emotional category to generate an emotional evolution sequence

S4.Extracting a target emotional evolution pattern from the emotional evolution sequence, and driving the virtual avatar to perform emotional expression according to the target emotional evolution pattern

FIG. 1

S31, the expression data and the audio data in the final alignment result are labeled by using the emotional category corresponding to the multi-modal emotional feature fusion result to obtain labeled expression data and audio data

S32, the positive and negative polarities and intensity value of the emotional category are determined, and the semantic vector of the emotional category is obtained by using an emotional knowledge representation algorithm based on a neural network according to the labeled expression data and audio data as well as the positive and negative polarities and intensity value

S33, the multi-modal emotional feature fusion result is labeled by using the semantic vector of the emotional category to generate an emotional semantic sequence

S34, the fitness among different emotional semantics in the emotional semantic sequence is calculated by using a kernel function

S35, it is determined whether the fitness is lower than a preset fitness threshold, if yes, the emotional semantics corresponding to the fitness are amended by using a semantic rewriting algorithm to obtain an amended emotional semantic sequence, and the emotional evolution sequence is generated based on the amended emotional semantic sequence by using a time sequence analysis algorithm, and if not, the emotional evolution sequence is generated based on the emotional semantic sequence by using a time sequence analysis algorithm

FIG. 11

S111, an expression detection component is attached to the virtual avatar to monitor expression changes of the virtual avatar in scenarios such as teaching, discussion and learning communication

S112, an audio monitoring component is attached to the virtual avatar, and an audio sampling rate, a sampling bit and a quantization bit are set to record a conversation audio signal of the virtual avatar

S113, the conversation audio signal is processed by using an adaptive beam-forming algorithm according to spatial position coordinates of the virtual avatar in a scenario to obtain a processed conversation audio signal, thereby increasing frequency response and amplitude ranges of the audio signal

S114, the processed conversation audio signal is integrated by using a real-time audio mixing technology to obtain the audio data

S115, expression changes of the virtual avatar are used as elements, key points and change values corresponding to the expression changes are recorded, and the expression data such as a smiling expression change of the virtual avatar is standardized in an XML format and is saved in an .XML file format

S116, the audio data is saved in a .WAV lossless compressed digital audio file format

S117, the expression data and the audio data are replicated and saved in a cloud server according to an SFTP uploading protocol (SSH File Transfer Protocol) in conjunction with a hot backup strategy

FIG. 13

EMOTIONAL EVOLUTION METHOD AND TERMINAL FOR VIRTUAL AVATAR IN EDUCATIONAL METAVERSE

CROSS-REFERENCE TO RELATED APPLICATIONS

This application claims priority to Chinese Patent Application No. 202310815919.5, filed on Jul. 5, 2023, the content of which is incorporated herein by reference in its entirety.

TECHNICAL FIELD

The present disclosure relates to the technical field of teaching applications of metaverse, in particular to an emotional evolution method and an emotional evolution terminal for a virtual avatar in educational metaverse.

BACKGROUND

An emotional evolution technology refers to the achievement of an emotional evolution process, namely the simulation of the generation, development, change and expression of emotions by using a computer technology, thereby achieving more real and natural emotional communication. It is widely applied to the field of human-computer interaction to analyze and model emotional factors such as voice and facial expressions of a user. It can effectively recognize and parse emotional information and infer the trend of emotional changes. With the continuous maturity of natural language processing, deep learning and other technologies, the emotional evolution technology is more and more widely applied to an intelligent teaching system so as to be closer to a human emotional expression way and more accurately feed back a conversation between a teacher user and a student user.

In educational metaverse, the emotional evolution technology can provide more abundant emotional expression and feedback for a virtual avatar, thereby providing a new approach for the emotional evolution of the virtual avatar. In the existing educational metaverse, although the emotional evolution technology can be used to infer emotional rules of the virtual avatar driven by the real teacher and student users, there are still many problems:

(1) its own data is not taken into account in the emotional evolution of the virtual avatar: it is difficult to achieve the emotional self-evolution of the virtual avatar only based on expression and conversation data of the real teacher and student users;
(2) there is a heterogeneity problem in multi-modal data: a fusion strategy for a feature layer, a decision layer and a model layer is mostly used in multi-modal emotional feature fusion, but no unified and united emotional feature representation is formed; and
(3) there is a lack of semantic information of emotional categories in the emotional evolution process: due to the lack of the semantic information of the emotional categories, it is relatively difficult for a constructed emotional evolution model to accurately describe transfer and conversion relationships among the different emotional categories.

SUMMARY

A technical problem to be solved in the present disclosure is to provide an emotional evolution method and terminal for a virtual avatar in educational metaverse, by which the emotional perception ability of the virtual avatar can be improved, and more abundant and real emotional expression can be achieved.

In order to solve the above-mentioned technical problem, the present disclosure adopts the technical solution.

Provided is an emotional evolution method for a virtual avatar in educational metaverse, including the following steps:

collecting expression data and audio data of the virtual avatar, and performing emotional feature extraction based on the expression data and the audio data to obtain a sound emotional feature and an expression emotional feature;

fusing the sound emotional feature with the expression emotional feature by using an emotional feature fusion model to obtain a multi-modal emotional feature fusion result, and performing emotion recognition on the multi-modal emotional feature fusion result to obtain emotional category corresponding to the multi-modal emotional feature fusion result;

determining semantic vector of the emotional category, and labeling the multi-modal emotional feature fusion result based on the semantic vector of the emotional category to generate an emotional evolution sequence; and extracting a target emotional evolution pattern from the emotional evolution sequence, and driving the virtual avatar to perform emotional expression according to the target emotional evolution pattern.

In order to solve the above-mentioned technical problem, the present disclosure adopts another technical solution.

Provided is an emotional evolution terminal for a virtual avatar in educational metaverse, including a memory, a processor, and a computer program stored on the memory and capable of running on the processor, the processor, when executing the computer program, implements the following steps:

collecting expression data and audio data of the virtual avatar, and performing emotional feature extraction based on the expression data and the audio data to obtain a sound emotional feature and an expression emotional feature;

fusing the sound emotional feature with the expression emotional feature by using an emotional feature fusion model to obtain a multi-modal emotional feature fusion result, and performing emotion recognition on the multi-modal emotional feature fusion result to obtain an emotional category corresponding to the multi-modal emotional feature fusion result;

determining a semantic vector of the emotional category, and labeling the multi-modal emotional feature fusion result based on the semantic vector of the emotional category to generate an emotional evolution sequence; and extracting a target emotional evolution pattern from the emotional evolution sequence, and driving the virtual avatar to perform emotional expression according to the target emotional evolution pattern.

The present disclosure has the beneficial effects that: by collecting expression data and audio data of the virtual avatar, and performing emotional feature extraction based on the expression data and the audio data; fusing an extracted sound emotional feature with an extracted expression emotional feature by using an emotional feature fusion model, and performing emotion recognition on a multi-modal emotional feature fusion result obtained by fusion to obtain an emotional category corresponding to the multi-modal emotional feature fusion result; labeling the multi-modal emotional feature fusion result based on a semantic vector of the emotional category to generate an emotional evolution sequence; and driving the virtual avatar to perform emotional expression according to a target emotional evolution pattern extracted from the emotional evolution sequence, compared with the prior art, its own data of the virtual avatar can be collected in real time, a unified and united multi-modal emotional feature fusion result can be formed, and the final emotional expression can be achieved in conjunction with semantic information of the emotional category, so that the emotional self-evolution of the virtual avatar is achieved, a more abundant and intelligent emotional expression form is provided for the virtual avatar, then, the emotional perception ability of the virtual avatar is improved, and more abundant and real emotional expression is achieved.

BRIEF DESCRIPTION OF THE DRAWINGS

FIG. 1 is a flow diagram of steps of an emotional evolution method for a virtual avatar in educational metaverse according to an embodiment of the present disclosure.

FIG. 11 is a flow diagram of steps of generating an emotional evolution sequence according to an embodiment of the present disclosure.

FIG. 13 is a flow diagram of steps of collecting expression data and audio data according to an embodiment of the present disclosure.

DETAILED DESCRIPTION OF THE EMBODIMENTS

Figure 2:
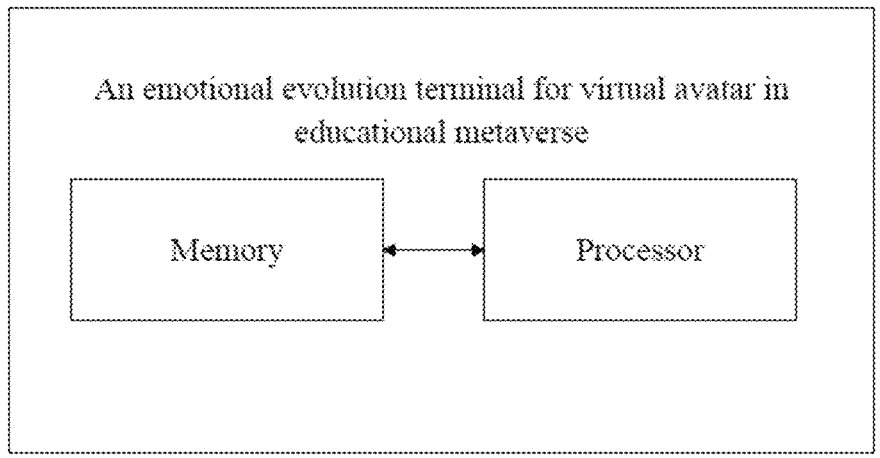
FIG. 2 is a schematic structural diagram of an emotional evolution terminal for a virtual avatar in educational metaverse according to an embodiment of the present disclosure.

In order to describe technical contents as well as objectives and effects to be achieved in the present disclosure in detail, the following description will be given in conjunction with implementations and cooperation with the accompanying drawings.

Refer to FIG. 1, provided is an emotional evolution method and terminal for a virtual avatar in educational metaverse, including the steps:
expression data and audio data of the virtual avatar are collected, and emotional feature extraction is performed based on the expression data and the audio data to obtain a sound emotional feature and an expression emotional feature;
the sound emotional feature is fused with the expression emotional feature by using an emotional feature fusion model to obtain a multi-modal emotional feature fusion result, and emotion recognition is performed on the multi-modal emotional feature fusion result to obtain an emotional category corresponding to the multi-modal emotional feature fusion result;
a semantic vector of the emotional category is determined, and the multi-modal emotional feature fusion result is labeled based on the semantic vector of the emotional category to generate an emotional evolution sequence; and
a target emotional evolution pattern is extracted from the emotional evolution sequence, and the virtual avatar is driven to perform emotional expression according to the target emotional evolution pattern.

It can be known from the above-mentioned description that the present disclosure has the beneficial effects that: by collecting expression data and audio data of the virtual avatar, and performing emotional feature extraction based on the expression data and the audio data; fusing an extracted sound emotional feature with an extracted expression emotional feature by using an emotional feature fusion model, and performing emotion recognition on a multi-modal emotional feature fusion result obtained by fusion to obtain an emotional category corresponding to the multi-modal emotional feature fusion result; labeling the multi-modal emotional feature fusion result based on a semantic vector of the emotional category to generate an emotional evolution sequence; and driving the virtual avatar to perform emotional expression according to a target emotional evolution pattern extracted from the emotional evolution sequence, compared with the prior art, its own data of the virtual avatar can be collected in real time, a unified and united multi-modal emotional feature fusion result can be formed, and the final emotional expression can be achieved in conjunction with semantic information of the emotional category, so that the emotional self-evolution of the virtual avatar is achieved, a more abundant and intelligent emotional expression form is provided for the virtual avatar, then, the emotional perception ability of the virtual avatar is improved, and more abundant and real emotional expression is achieved.

Further, the emotional feature extraction being performed based on the expression data and the audio data to obtain a sound emotional feature and an expression emotional feature includes:
- the expression data is pre-processed to obtain pre-processed expression data;
- the audio data is pre-processed to obtain pre-processed audio data;
- the pre-processed expression data is aligned to the pre-processed audio data by using a D-vectors algorithm in conjunction with a dynamic time warping algorithm to obtain a final alignment result; and
- emotional feature extraction is performed on the expression data and the audio data in the final alignment result to obtain the sound emotional feature and the expression emotional feature.

It can be known from the above-mentioned description that the expression data and the audio data are pre-processed to remove useless information so that subsequent data processing efficiency is increased, and at the same time, the pre-processed expression data is aligned to the pre-processed audio data by using the D-vectors algorithm in conjunction with the dynamic time warping algorithm, and emotional feature extraction is performed after alignment, so that the data reading efficiency is increased, and the emotional features are extracted more rapidly.

Further, the emotional feature extraction being performed on the expression data and the audio data in the final alignment result to obtain the sound emotional feature and the expression emotional feature includes:
- the audio data in the final alignment result is segmented by using a preset window size to obtain window signals;
- amplitude and phase time-frequency distribution of each of the window signals is calculated by using a Fourier transform algorithm;
- the amplitude and phase time-frequency distribution is spliced in chronological order to generate a Mel-frequency cepstral coefficient;
- the Mel-frequency cepstral coefficient is inputted to a recurrent neural network, and the sound emotional feature is outputted;
- a discrete transform matrix is generated by using an discrete cosine transformation algorithm according to the expression data in the final alignment result;
- the discrete transform matrix is converted into expression change feature representation by using a Gaussian mixture model algorithm; and
- the expression change feature representation is inputted to a preset expression emotional feature extraction model, and the expression emotional feature is outputted.

It can be known from the above-mentioned description that the Mel-frequency cepstral coefficient is inputted to the recurrent neural network, and the sound emotional feature is outputted; the discrete transform matrix is converted into expression change feature representation by using the Gaussian mixture model algorithm; and then, the expression change feature representation is inputted to the preset expression emotional feature extraction model to obtain the expression emotional feature, so that data is further understood and analyzed later, and the processing efficiency is increased.

Further, the sound emotional feature being fused with the expression emotional feature by using an emotional feature fusion model to obtain a multi-modal emotional feature fusion result includes:
- the sound emotional feature and the expression emotional feature are respectively normalized to obtain a sound emotional feature vector and an expression emotional feature vector;
- the similarity between the sound emotional feature vector and the expression emotional feature vector are calculated by using a Chebyshev distance;
- a weight ratio of each vector is calculated by using an attention mechanism according to the similarity and based on the sound emotional feature vector and the expression emotional feature vector, the vector is the sound emotional feature vector or the expression emotional feature vector;
- sound emotional feature vector representation and expression emotional feature vector representation are obtained according to the weight ratio of each vector, the sound emotional feature vector and the expression emotional feature vector; and
- the sound emotional feature vector representation and the expression emotional feature vector representation are inputted to an emotional feature fusion model, and the multi-modal emotional feature fusion result is outputted.

It can be known from the above-mentioned description that the sound emotional feature vector representation and the expression emotional feature vector representation are inputted to the emotional feature fusion model, and the multi-modal emotional feature fusion result is outputted, so that unified and united emotional feature representation can be formed, and the accuracy rate of recognition can be effectively increased during subsequent emotion recognition.

Further, the emotion recognition being performed on the multi-modal emotional feature fusion result to obtain an emotional category corresponding to the multi-modal emotional feature fusion result includes:
- the multi-modal emotional feature fusion result is inputted to a preset emotion recognition model, and a confidence score of the emotional category is outputted;
- similarities between the confidence score and each of preset emotional category vectors are calculated by using an Euclidean distance; and
- the maximum similarity is selected from the similarities, and a target preset emotional category vector corresponding to the maximum similarity is determined as the emotional category corresponding to the multi-modal emotional feature fusion result.

It can be known from the above-mentioned description that the target preset emotional category vector corresponding to the maximum similarity is determined as the emotional category corresponding to the multi-modal emotional feature fusion result, so that the current corresponding emotion of the virtual avatar can be obtained, and more accurate emotional evolution can be achieved later.

Further, a semantic vector of the emotional category being determined includes:
- the expression data and the audio data in the final alignment result are labeled by using the emotional category corresponding to the multi-modal emotional feature fusion result to obtain labeled expression data and audio data; and
- the positive and negative polarities and intensity value of the emotional category are determined, and the semantic vector of the emotional category is obtained by using an emotional knowledge representation algorithm based on a neural network according to the labeled expression data and audio data as well as the positive and negative polarities and intensity value.

It can be known from the above-mentioned description that the semantic vector of the emotional category is obtained by using the emotional knowledge representation algorithm based on the neural network according to the labeled expression data and audio data as well as the positive and negative polarities and intensity value, and thus, the transfer and conversion relationships among the different emotional categories can be accurately described.

Further, the multi-modal emotional feature fusion result being labeled based on the semantic vector of the emotional category to generate an emotional evolution sequence includes:

the multi-modal emotional feature fusion result is labeled by using the semantic vector of the emotional category to generate an emotional semantic sequence;

the fitness among different emotional semantics in the emotional semantic sequence is calculated by using a kernel function; and it is determined whether the fitness is lower than a preset fitness threshold, if yes, the emotional semantics corresponding to the fitness are amended by using a semantic rewriting algorithm to obtain an amended emotional semantic sequence, and the emotional evolution sequence is generated based on the amended emotional semantic sequence by using a time sequence analysis algorithm, and if not, the emotional evolution sequence is generated based on the emotional semantic sequence by using a time sequence analysis algorithm.

It can be known from the above-mentioned description that the accuracy of the emotional evolution sequence can be ensured by amending the emotional semantic sequence, so that the more accurate emotional expression of the virtual avatar is achieved.

Further, a target emotional evolution pattern being extracted from the emotional evolution sequence includes:

an emotional evolution pattern set is determined by using a generalized sequential pattern mining algorithm according to the emotional semantics in the emotional evolution sequence;

a probability value of each emotional evolution pattern in the emotional evolution pattern set is calculated by using a conditional random field algorithm; and the emotional evolution pattern with the maximum probability value is determined as the target emotional evolution pattern.

It can be known from the above-mentioned description that the probability value of each emotional evolution pattern in the emotional evolution pattern set is calculated by using the conditional random field algorithm, the emotional evolution pattern with the maximum probability value is determined as the target emotional evolution pattern, and the target emotional evolution pattern can be used as a reference standard of subsequent emotional expression, so that more abundant and real emotional expression is achieved.

Further, the virtual avatar being driven to perform emotional expression according to the target emotional evolution pattern includes:

the expression change feature representation and the multi-modal emotional feature fusion result are inputted to a potential space model based on deep learning, and a potential distribution space of emotion-expression changes is outputted;

the target emotional evolution pattern is converted into coordinate changes of facial key points of the virtual avatar by using the potential distribution space of emotion-expression changes;

facial texture information of the virtual avatar is acquired;

the facial texture information is updated by using a dynamic texture mapping algorithm according to the coordinate changes of the facial key points to obtain the latest facial texture information;

facial expression changes of the virtual avatar are driven according to the latest facial texture information;

the target emotional evolution pattern is converted into a body action instruction by using an inertial measurement algorithm;

a virtual coordinate system is established by using a coordinate transformation algorithm, and the body action instruction is converted into a limb motion trajectory of the virtual avatar according to the virtual coordinate system; and motion parameters are calculated based on the limb motion trajectory, and the body motion of the virtual avatar is driven according to the motion parameters.

It can be known from the above-mentioned description that the expression change feature representation and the multi-modal emotional feature fusion result are inputted to the potential space model based on deep learning, and the potential distribution space of emotion-expression changes is outputted; the target emotional evolution pattern is converted according to the potential distribution space of emotion-expression changes; and finally, the facial expression changes and the body motion of the virtual avatar are driven, so that the emotional self-evolution of the virtual avatar is achieved, and a more abundant and intelligent emotional expression form is provided for the virtual avatar.

Refer to FIG. 2, another embodiment of the present disclosure provides an emotional evolution terminal for a virtual avatar in educational metaverse, including a memory, a processor, and a computer program stored on the memory and capable of running on the processor. The processor, when executing the computer program, implements each of the steps of the above-mentioned emotional evolution method for the virtual avatar in educational metaverse.

The above-mentioned emotional evolution method and terminal for the virtual avatar in educational metaverse in the present disclosure are applicable to educational metaverse scenarios where there are virtual avatars. The following description is based on specific implementations.

Refer to FIG. 1 and FIGS. 3-8, embodiment 1 of the present disclosure is described as follows.

Figure 3:
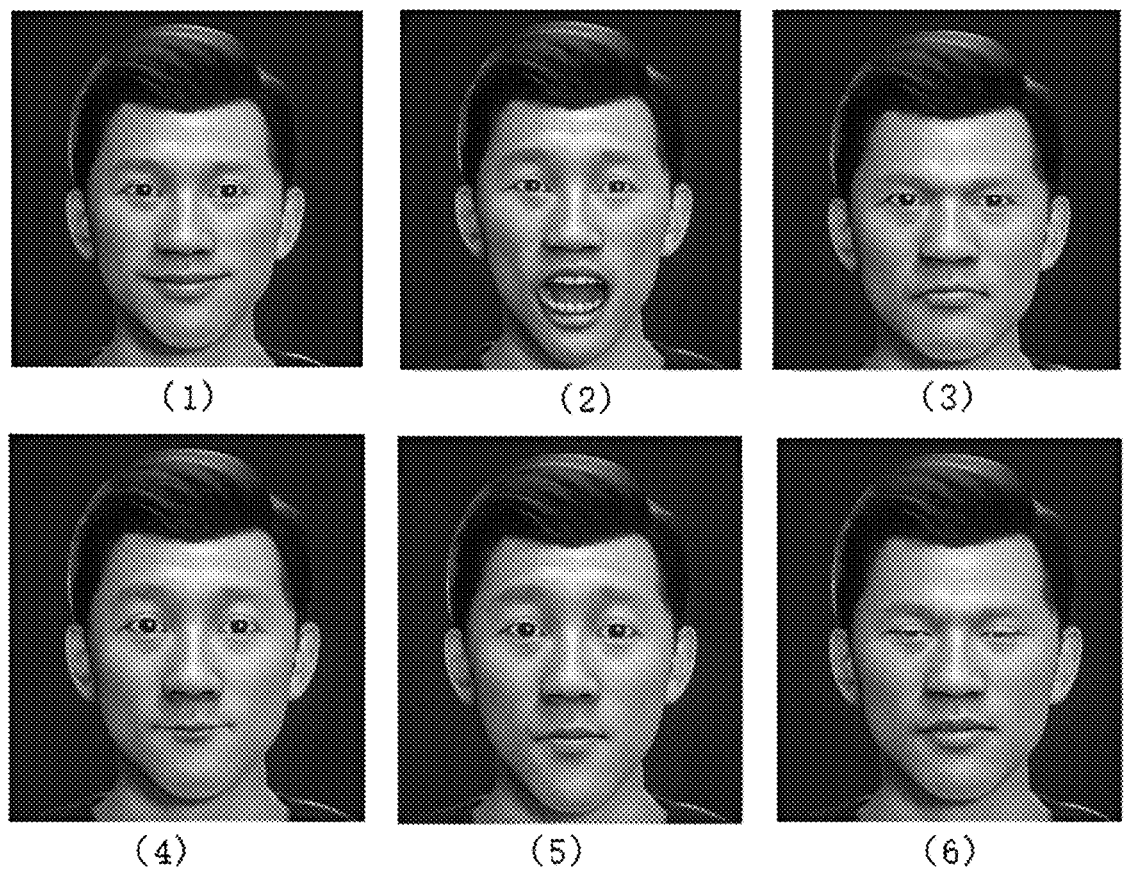
FIG. 3 is a schematic diagram of expression changes of a virtual avatar in an emotional evolution method for a virtual avatar in educational metaverse according to an embodiment of the present disclosure.

Provided is an emotional evolution method for a virtual avatar in educational metaverse, including the steps:

S1, expression data and audio data of the virtual avatar are collected, and emotional feature extraction is performed based on the expression data and the audio data to obtain a sound emotional feature and an expression emotional feature, which specifically includes:

S11, expression data and audio data of the virtual avatar are collected, which specifically includes:

in an optional implementation, the virtual avatar includes a teacher virtual avatar and a student virtual avatar;

S111, an expression detection component is attached to the virtual avatar to monitor expression changes of the virtual avatar in scenarios such as teaching, discussion and learning communication; as shown in FIG. 3, the expression changes include smiling ((1) in FIG. 3), mouth opening ((2) in FIG. 3), staring ((3) in FIG. 3), mouth contraction ((4) in FIG. 3), calming ((5) in FIG. 3) and squinting ((6) in FIG.

Figure 4:
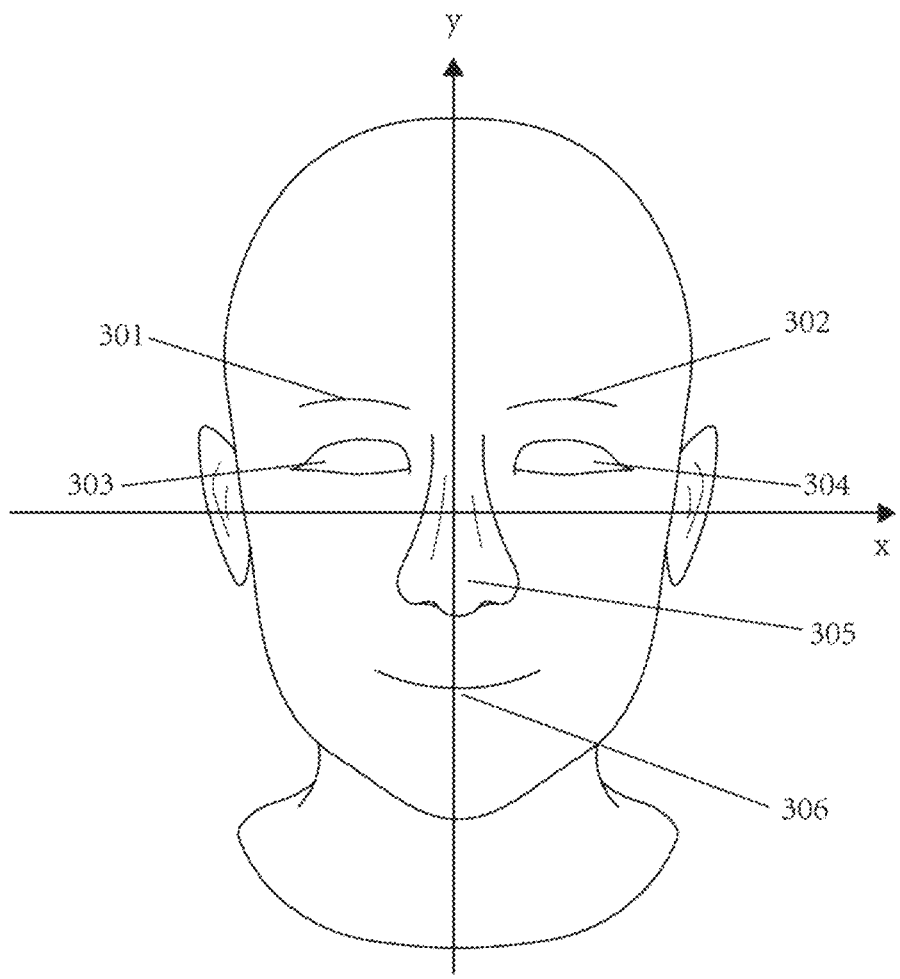
FIG. 4 is a schematic diagram of indexes and position coordinates of facial key points of a virtual avatar in an emotional evolution method for a virtual avatar in educational metaverse according to an embodiment of the present disclosure.

3); and as shown in FIG. 4, indexes sequentially labeled as LEB, REB, LE, RE, N, and M and coordinate positions sequentially labeled as $(x_{LEB}, y_{LEB})$, $(x_{REB}, y_{REB})$, $(x_{LE}, y_{LE})$, $(x_{RE}, y_{RE})$, $(x_N, y_N)$ and $(x_M, y_M)$ of facial key points including the left eyebrow (301 in FIG. 4), the right eyebrow (302 in FIG. 4), the left eye (303 in FIG. 4), the right eye (304 in FIG. 4), the nose (305 in FIG. 4) and the mouth (306 in FIG. 4) corresponding to the expression changes of the virtual avatar are acquired as the expression data.

S112, an audio monitoring component is attached to the virtual avatar, and an audio sampling rate, a sampling bit and a quantization bit are set to record a conversation audio signal of the virtual avatar.

S113, the conversation audio signal is processed by using an adaptive beam-forming algorithm according to spatial position coordinates of the virtual avatar in a scenario to obtain a processed conversation audio signal, thereby increasing frequency response and amplitude ranges of the audio signal, which specifically includes:

(1) spatial position coordinates (x, y) of the virtual avatar in a scenario are acquired;

(2) the spatial position coordinates (x, y) are converted into coordinates of queue elements, specifically:

$$a_i = \frac{x}{AES}, b_i = \frac{y}{AES};$$

$a_i$ represents coordinates of the queue elements in x direction, $b_i$ represents coordinates of the queue elements in y direction, and AES represents a spacing between the queue elements;

(3) a distance DS from each of the queue elements to the virtual avatar is calculated according to the coordinates of the queue elements, specifically:

$$DS = \sqrt{(a_i - x)^2 + (b_i - y)^2}$$

(4) a phase delay PL of each of the queue elements is calculated according to the distance DS from each of the queue elements to the virtual avatar, specifically:

$$PL = \frac{DS}{\theta};$$

$\theta$ represents a beam pointing angle;

(5) a weight $\theta$ of each of the queue elements is calculated according to the phase delay PL of each of the queue elements, specifically:

$$W = e^{2\pi f(PL - \alpha)};$$

f represents a cut-off frequency of a high-pass filter, and a represents a weight adjustment parameter;

(6) an audio frequency and an amplitude are respectively amended to obtain an amended audio frequency $\hat{f}$ and an amended amplitude $\hat{A}$, specifically:

$$\hat{f} = \frac{1}{F} \times [s + d \times W];$$

$$\hat{A} = \frac{1}{A} \times [s + d \times W];$$

F represents the audio frequency, A represents the amplitude, d represents the impulse response of a long-range spatial filter, and s represents the conversation audio signal; and (7) a processed conversation audio signal is generated according to the amended audio frequency $\hat{f}$ and the amended amplitude $\hat{A}$.

S114, the processed conversation audio signal is integrated by using a real-time audio mixing technology to obtain the audio data.

S115, expression changes of the virtual avatar are used as elements, key points and change values corresponding to the expression changes are recorded, and the expression data such as a smiling expression change of the virtual avatar is standardized in an XML format and is saved in an .XML file format.

The step that the data is standardized is described with the smiling expression change as an example, specifically:

(1) position coordinates of the left eye, the right eye and the mouth of the virtual avatar are initialized as $(x_{a0}, y_{a0}, z_{a0})$, $(x_{b0}, y_{b0}, z_{b0})$, and $(x_{c0}, y_{c0}, z_{c0})$;

(2) a keyword, a type, a position type, a duration and mapping are respectively defined as key, type, position, duration, and mapping;

(3) after a smiling expression is changed, position coordinates of the left eye, the right eye and the mouth of the virtual avatar are $(x_{a1}, y_{a1}, z_{a1})$, $(x_{b1}, y_{b1}, z_{b1})$, and $(x_{c1}, y_{c1}, z_{c1})$, and the duration is d; and (4) the expression data of the virtual avatar is standardized by using the following formula:

{key: LE, type: position, mapping: {{$x_{a0}$, $x_{a1}$} {$y_{a0}$, $y_{a1}$} {$z_{a0}$, $z_{a1}$}}, key: RE, type: position, mapping: {{$x_{b0}$, $x_{b1}$} {$y_{b0}$, $y_{b1}$} {$z_{b0}$, $z_{b1}$}}, key: M, type: position, mapping: {{$x_{c0}$, $x_{c1}$} {$y_{c0}$, $y_{c1}$} {$z_{c0}$, $z_{c1}$}}, key: duration, type: float (floating-point data type), duration: d}.

S116, the audio data is saved in a. WAV lossless compressed digital audio file format.

S117, the expression data and the audio data are replicated and saved in a cloud server according to an SFTP uploading protocol (SSH File Transfer Protocol) in conjunction with a hot backup strategy.

S12, the expression data is pre-processed to obtain pre-processed expression data, which specifically includes:

S121, geometric, texture, illumination and attitude parameters of the expression changes in the expression data of the virtual avatar are calculated by using a Fast-SIC fitting algorithm.

S122, expression parameter change confidence is acquired by using an information entropy algorithm according to the geometric, texture, illumination and attitude parameters of the expression changes.

S123, the expression change with the lowest expression parameter change confidence is rejected from the expression data, and a noise point and a breaking point in the rejected expression data are removed by using a smoothing algorithm based on a spatial pyramid to obtain the pre-processed expression data.

S13, the audio data is pre-processed to obtain pre-processed audio data, which specifically includes:

S131, capturing and removing frequency components in the audio data by using a fast Fourier transform denoising method, and filtering out background noise and abnormal sound to obtain filtered audio data.

S132, proportions of treble, alto and bass in the filtered audio data are adjusted by adopting an equalizer, the tone and quality of an audio are improved, and the volume, balance and frequency parameters of the audio are adjusted by using an adaptive equalizer algorithm to obtain pre-processed audio data.

S14, the pre-processed expression data is aligned to the pre-processed audio data by using a D-vectors algorithm in conjunction with a dynamic time warping algorithm to obtain a final alignment result, which specifically includes:

S141, a threshold and a step length alignment parameter between the pre-processed expression data and the pre-processed audio data are calculated by using the D-vectors algorithm.

S142, a matching distance is acquired by using a dynamic time warping algorithm, the minimum matching distance is selected therefrom, a parameter value is acquired, the pre-processed expression data is aligned to the pre-processed audio data to obtain an initial alignment result.

S143, the initial alignment result is optimized and adjusted by using a particle swarm optimization algorithm to obtain a final alignment result;

in an optional implementation, specifically:

(1) smiling, staring and calming expression changes and a sound are defined as $\{e_{smiling}, e_{staring}, e_{calming}\}$ and $\{v_{smiling}, v_{staring}, v_{calming}\}$;

(2) $\{e_{smiling}, v_{smiling}\}$, $\{e_{staring}, v_{staring}\}$ and $\{e_{calming}, v_{calming}\}$ particles are sequentially constructed in an expression change and sound order;

(3) a speed, weight and position of a particle swarm are initialized, specifically:

$$v_i(0), w_i(0), p_i(0) = v_0, w_0, p_0;$$

i are serial numbers of particles, $v_i(0)$ represent speeds of uninitialized particles, $w_i(0)$ represents weights of uninitialized particles, $p_i(0)$ represent positions of uninitialized particles, $v_0$ represents initial speeds of particles, $w_0$ represents initial weights of particles, and p0 represents initial positions of particles;

(4) a distance between each particle and each of other particles is calculated, specifically:

$$c_i(t+1) = c_i(t) \times w_i(t);$$

$c_i(t)$ represents a competitive weight of an $i^{th}$ particle during $t^{th}$ iteration, and an initial value thereof is 1, $c_i(t+1)$ represents a competitive weight of an $i^{th}$ particle during $(t+1)^{th}$ iteration, and $w_i(t)$ represents a weight of an $i^{th}$ particle during $t^{th}$ iteration;

(5) positions of the particles are iteratively updated, specifically:

$$p_i(t+1) = p_i(t) \times (1-a_i(t)) + a_i(t) \times c_i(t) \times \frac{1}{M}\sum_{j=1}^{M} v_j(t);$$

$p_i(t+1)$ represents a position of the $i^{th}$ particle during $(t+1)^{th}$ iteration, $p_i(t)$ represents a position of the $i^{th}$ particle during $t^{th}$ iteration, $v_j(t)$ represents a speed of the $j^{th}$ particle during $t^{th}$ iteration, $\alpha_i(t)$ represents an adaptive parameter for controlling a speed and direction of the $i^{th}$ particle, and M represents the number of particles; and (6) a particle order is adjusted as $\{e_{smiling}, v_{smiling}\}$, $\{e_{calming}, v_{calming}\}$ and $\{e_{staring}, v_{staring}\}$ according to the positions of the particles, and the adjusted expression changes and sound are acquired as $\{e_{smiling}, e_{calming}, e_{staring}\}$ and $\{v_{smiling}, v_{calming}, v_{staring}\}$ in the adjusted particle order so as to be used as the final alignment result.

S15, emotional feature extraction is performed on the expression data and the audio data in the final alignment result to obtain a sound emotional feature and an expression emotional feature, which specifically includes:

S151, the audio data in the final alignment result is segmented by using a preset window size to obtain window signals.

S152, amplitude and phase time-frequency distribution of each of the window signals is calculated by using a Fourier transform algorithm.

S153, the amplitude and phase time-frequency distribution is spliced in chronological order to generate a Mel-frequency cepstral coefficient.

S154, the Mel-frequency cepstral coefficient is inputted to a recurrent neural network, and the sound emotional feature is outputted, he sound emotional feature includes a formant frequency and a harmonic noise ratio.

S155, a discrete transform matrix is generated by using an discrete cosine transformation algorithm according to the expression data in the final alignment result, the discrete transform matrix includes a translation discrete transform matrix, a rotation discrete transform matrix, a scaling discrete transform matrix and a shear-warp discrete transform matrix;

specifically, the translation discrete transform matrix, the rotation discrete transform matrix, the scaling discrete transform matrix and the shear-warp discrete transform matrix are generated by using the discrete cosine transformation algorithm according to facial key points of the expression data in the final alignment result and changes thereof.

S156, the discrete transform matrix is converted into expression change feature representation by using a Gaussian mixture model algorithm, specifically:

(1) the discrete transform matrix A is acquired;

(2) the discrete transform matrix A is reconstructed to obtain the latest discrete transform matrix X, specifically:

$$X = CA + \sigma^2 A;$$

$\sigma^2$ represents a variance of the discrete transform matrix A, and C represents a covariance matrix of the discrete transform matrix A;

(3) an n×n covariance matrix U is initialized, n represents a dimension of the latest discrete transform matrix X;

(4) the covariance matrix U is iteratively calculated as:

$$Cov(U) = \frac{\sum_{i=1}^{n} X^i X^{i-1}}{n}$$

$X^i$ represents the $i^{th}$ row of the latest discrete transform matrix X;

(5) if $Cov(U) \approx 0$, iteration is stopped, and U is acquired as a feature vector of the discrete transform matrix A; and (6) the expression change feature representation is obtained according to the feature vector of the discrete transform matrix A.

Figure 5:
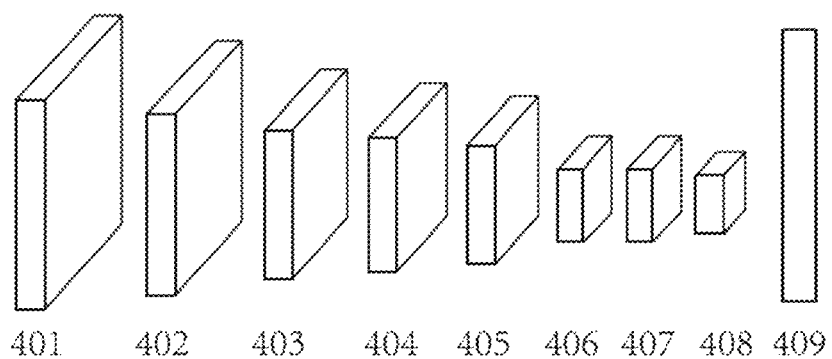
FIG. 5 is a schematic diagram of a preset expression emotional feature extraction model in an emotional evolution method for a virtual avatar in educational metaverse according to an embodiment of the present disclosure.

S157, the expression change feature representation is inputted to a preset expression emotional feature extraction model, and the expression emotional feature is outputted; as shown in FIG. 5, the preset expression emotional feature extraction model sequentially consists of two convolutional neural network layers (401 and 402 in FIG. 5) with 5×5 convolution kernels, a maximum pooling layer (403 in FIG. 5), a convolutional neural network layer (404 in FIG. 5) with a 3×3 convolution kernel, a maximum pooling layer (405 in FIG. 5), a convolutional neural network layers (406 in FIG. 5) with a 3×3 convolution kernel, a convolutional neural network layers (407 in FIG. 5) with a 1×1 convolution kernel, a maximum pooling layer (408 in FIG. 5), and a fully-connected layer (409 in FIG. 5);

specifically, the expression change feature representation is inputted to the preset expression emotional feature extraction model, and expression emotional features such as gladness, surprise, boredom, confusion, fatigue, concentration and confidence as facial expressions are extracted.

S2, the sound emotional feature is fused with the expression emotional feature by using an emotional feature fusion model to obtain a multi-modal emotional feature fusion result, and emotion recognition is performed on the multi-modal emotional feature fusion result to obtain an emotional category corresponding to the multi-modal emotional feature fusion result, which specifically includes:

S21, the sound emotional feature and the expression emotional feature are respectively normalized to obtain a sound emotional feature vector and an expression emotional feature vector;

specifically, the sound emotional feature and the expression emotional feature are mapped to the same dimension by using a t-distributed stochastic neighbor embedding algorithm to obtain an initial sound emotional feature vector and expression emotional feature vector;

mean values and variances of the initial sound emotional feature vector and expression emotional feature vector are respectively calculated, the mean values are subtracted from values of the initial sound emotional feature vector and expression emotional feature vector, then, an obtained result is divided by a standard deviation, and then, values of vector elements are mapped to a range [−1, 1] to obtain the sound emotional feature vector and the expression emotional feature vector.

S22, the similarity between the sound emotional feature vector and the expression emotional feature vector is calculated by using a Chebyshev distance.

S23, a weight ratio of each vector is calculated by using an attention mechanism according to the similarity and based on the sound emotional feature vector and the expression emotional feature vector, the vector is the sound emotional feature vector or the expression emotional feature vector;

in an optional implementation, the attention mechanism is based on fine granularity.

S24, sound emotional feature vector representation and expression emotional feature vector representation are obtained according to the weight ratio of each vector, the sound emotional feature vector and the expression emotional feature vector;

specifically, the weight ratio of each vector is respectively multiplied by each dimension of the sound emotional feature vector and the expression emotional feature vector respectively corresponding to the weight ratio to obtain the sound emotional feature vector representation and the expression emotional feature vector representation, so that different weight ratios are provided for the feature vectors.

Figure 6:
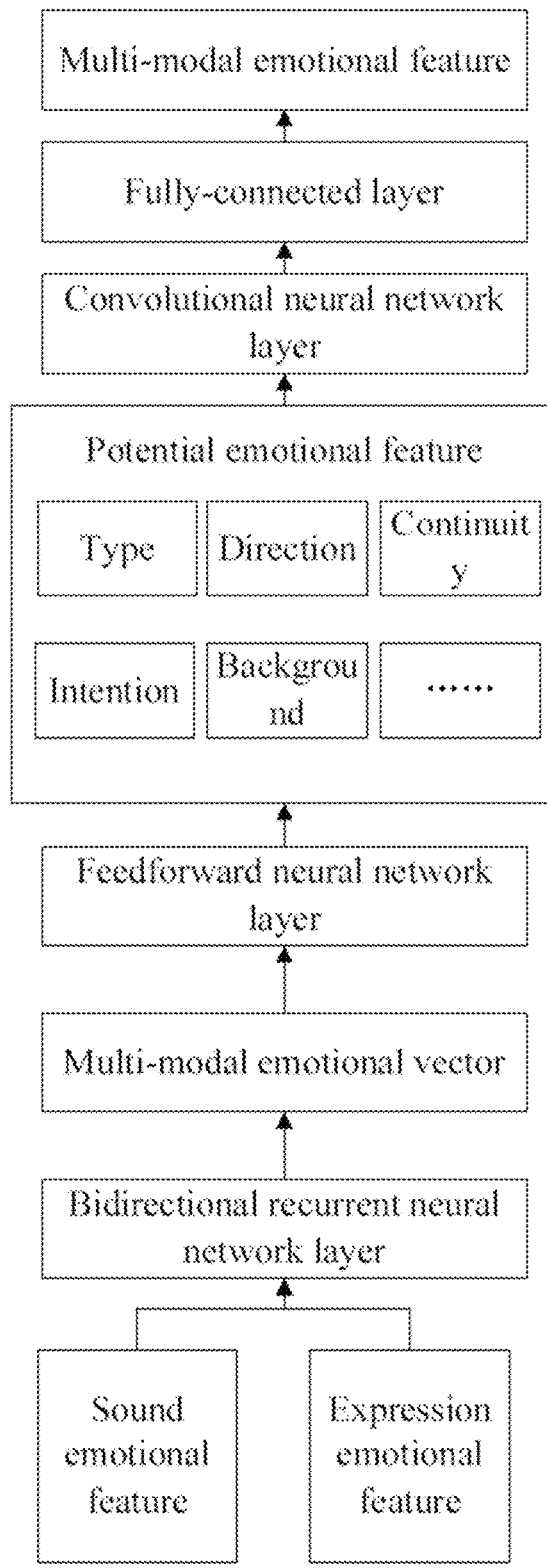
FIG. 6 is a schematic diagram of an emotional feature fusion model in an emotional evolution method for a virtual avatar in educational metaverse according to an embodiment of the present disclosure.

S25, the sound emotional feature vector representation and the expression emotional feature vector representation are inputted to an emotional feature fusion model, and the multi-modal emotional feature fusion result is outputted;

the emotional feature fusion model sequentially consists of a bidirectional recurrent neural network layer, a feedforward neural network layer, a convolutional neural network layer, and a fully-connected layer;

specifically, as shown in FIG. 6, the sound emotional feature vector representation and the expression emotional feature vector representation are inputted to the emotional feature fusion model, audio and visual information in the above-mentioned emotional feature vector representation is extracted and merged by using the bidirectional recurrent neural network layer in the model, an audio-visual modal emotional vector (i.e., a multi-modal emotional vector in FIG. 6) is acquired, potential emotional features such as type, direction, continuity, intention and background are extracted from the audio-visual modal emotional vector by adopting the feedforward neural network layer, these potential emotional features are fused by sequentially using the convolutional neural network layer and the fully-connected layer, and the multi-modal emotional feature fusion result is outputted.

In an optional implementation, between steps S25 and S26, the method further includes: preset emotional category vectors are determined, which specifically includes:

preset emotional categories such as gladness, happiness, contentment, joy, fear, jealousy, resentment, revenge, greed, superstition, anger, satisfaction, calmness, relaxation and comfort are determined according to the positive, negative and neutral polarities of emotions, and the positive and negative polarities and intensity values {+100, +50, +30, +20, −50, −20, −100, −25, −10, −55, −60, +25, +10, +15, +20} are provided for the preset emotional categories according to an MAHNOB-HCI multi-modal emotional database.

The preset emotional categories are sorted according to the positive and negative polarities and intensity values of the preset emotional categories, an emotional dictionary is constructed according to the sorted preset emotional categories, index positions and the total number of the emotional categories are acquired according to the emotional dictionary, the preset emotional categories are converted into vectors by using one-hot encoding, elements on the index positions in the vectors are 1, elements on the rest positions are 0, and thus, the preset emotional category vectors are obtained by the following specific steps (1) to (3):

the preset emotional categories are sorted from large to small according to the positive and negative polarities and intensity values of the preset emotional categories to obtain sorted preset emotional categories such as gladness, happiness, contentment, satisfaction, joy, comfort, relaxation, calmness, greed, jealousy, revenge, fear, superstition, anger, and resentment;

the emotional dictionary is constructed, the index positions are assigned to the sorted preset emotional categories, for example, the total number is acquired as 15, and an index position where a relaxation emotional category is assigned is 6; and (3) the preset emotional categories with the index positions i are encoded, specifically:

$$v=\{0,\ldots,x_i,\ldots,0\};$$

$x_i$ is an element with an index position i in the emotional category vectors, and a value thereof is 1; for example, the relaxation emotional category can be converted into a vector $v_{relaxation}=\{0,0,0,0,0,0,1,0,0,0,0,0,0,0,0\}$.

Figure 7:
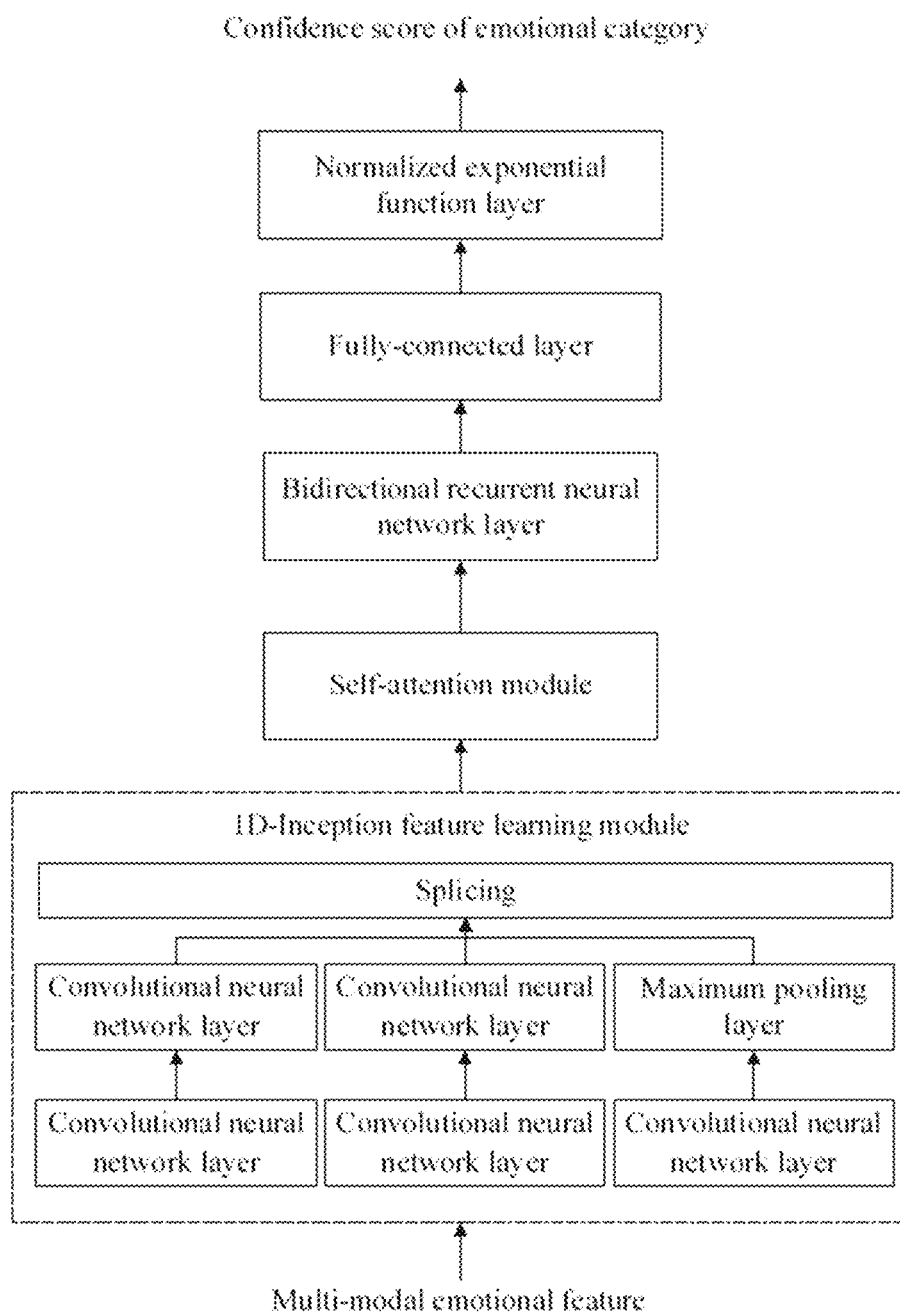
FIG. 7 is a schematic diagram of a preset emotion recognition model in an emotional evolution method for a virtual avatar in educational metaverse according to an embodiment of the present disclosure.

S26, the multi-modal emotional feature fusion result is inputted to a preset emotion recognition model, and a confidence score of the emotional category is outputted;

the preset emotion recognition model consists of a 1D-Inception feature learning module, a self-attention module, a bidirectional recurrent neural network layer, a fully-connected layer and a normalized exponential function layer which are sequentially stacked, and the ID-Inception feature learning module includes five convolutional neural network layers, one maximum pooling layer and one splicing layer, as shown in FIG. 7.

S27, similarities between the confidence score and each of preset emotional category vectors are calculated by using an Euclidean distance.

Specifically, the similarities between the confidence score and each of preset emotional category vectors are calculated by using the Euclidean distance.

S28, the maximum similarity is selected from the similarities, and a target preset emotional category vector corresponding to the maximum similarity is determined as the emotional category corresponding to the multi-modal emotional feature fusion result.

S3, a semantic vector of the emotional category is determined, and the multi-modal emotional feature fusion result is labeled based on the semantic vector of the emotional category to generate an emotional evolution sequence, which specifically includes:

S31, the expression data and the audio data in the final alignment result are labeled by using the emotional category corresponding to the multi-modal emotional feature fusion result to obtain labeled expression data and audio data;
   specifically, the emotional category corresponding to the multi-modal emotional feature fusion result is labeled for the expression data and the audio data in the final alignment result according to a time sequence to obtain the labeled expression data and audio data.

S32, the positive and negative polarities and intensity value of the emotional category are determined, and the semantic vector of the emotional category is obtained by using an emotional knowledge representation algorithm based on a neural network according to the labeled expression data and audio data as well as the positive and negative polarities and intensity value.

S33, the multi-modal emotional feature fusion result is labeled by using the semantic vector of the emotional category to generate an emotional semantic sequence;
   specifically, the multi-modal emotional feature fusion result is labeled by using the semantic vector of the emotional category to generate emotional semantics and form an emotional semantic sequence.

S34, the fitness among different emotional semantics in the emotional semantic sequence is calculated by using a kernel function.

S35, it is determined whether the fitness is lower than a preset fitness threshold, if yes, the emotional semantics corresponding to the fitness are amended by using a semantic rewriting algorithm to obtain an amended emotional semantic sequence, and the emotional evolution sequence is generated based on the amended emotional semantic sequence by using a time sequence analysis algorithm, and if not, the emotional evolution sequence is generated based on the emotional semantic sequence by using a time sequence analysis algorithm.

The emotional evolution sequence is generated based on the emotional semantic sequence by using a time sequence analysis algorithm, specifically:
   a time point when the emotional category is changed is captured from the emotional semantic sequence by using the time sequence analysis algorithm, and the emotional semantic sequence is labeled along a time axis to generate the emotional evolution sequence.

S4, a target emotional evolution pattern is extracted from the emotional evolution sequence, and
   the virtual avatar is driven to perform emotional expression according to the target emotional evolution pattern, which specifically includes:

S41, an emotional evolution pattern set is determined by using a generalized sequential pattern mining algorithm according to the emotional semantics in the emotional evolution sequence;
   specifically, the similarity, opposition, background, juxtaposition and transfer relationships between the adjacent emotional semantics in the emotional evolution sequence are calculated by using the generalized sequential pattern mining algorithm, and the emotional evolution pattern set is obtained by deduction.

S42, a probability value of each emotional evolution pattern in the emotional evolution pattern set is calculated by using a conditional random field algorithm;
   the conditional random field algorithm includes the steps:
   (1) the emotional evolution pattern is defined as $Q=\{w_1, w_2, w_3, \ldots, w_n\}$, n represents a length of the emotional evolution pattern;
   (2) an embedding matrix is initialized, specifically:

$$M_{ij}=P(w_i|w_j);$$

$w_i$ represents the emotional category on the $i^{th}$ position, $w_j$ represents the emotional category on the $j^{th}$ position, and $M_{ij}$ represents a probability value that the emotional category $w_i$ appears before the emotional category $w_j$;
   (3) a probability value of each emotional category is obtained by using forward calculation and backward calculation, specifically:

$$P(w_i) = \sum_{j=1}^{n} M_{ij} P(w_j);$$

$$P(w_i|w_j) = \frac{P(w_j|W_i)P(W_i)}{P(w_j)};$$

$P(w_j|w_i)$ represents a probability value that the emotional category $w_j$ appears before the emotional category $w_i$, $P(w_i|w_j)$ represents a probability value that the emotional category $w_i$ appears before the emotional category $w_j$, $P(w_i)$ represents a probability that the emotional category on the $i^{th}$ position appears, and $P(w_j)$ represents a probability that the emotional category on the $j^{th}$ position appears; and
   (4) a probability value $P(Q)$ of each emotional evolution pattern is calculated, specifically:

$$P(Q)=P(w_1|w_2)P(w_2|w_3) \ldots P(w_{n-1}|w_n);$$

S43, the emotional evolution pattern with the maximum probability value is determined as the target emotional evolution pattern.

Figure 8:
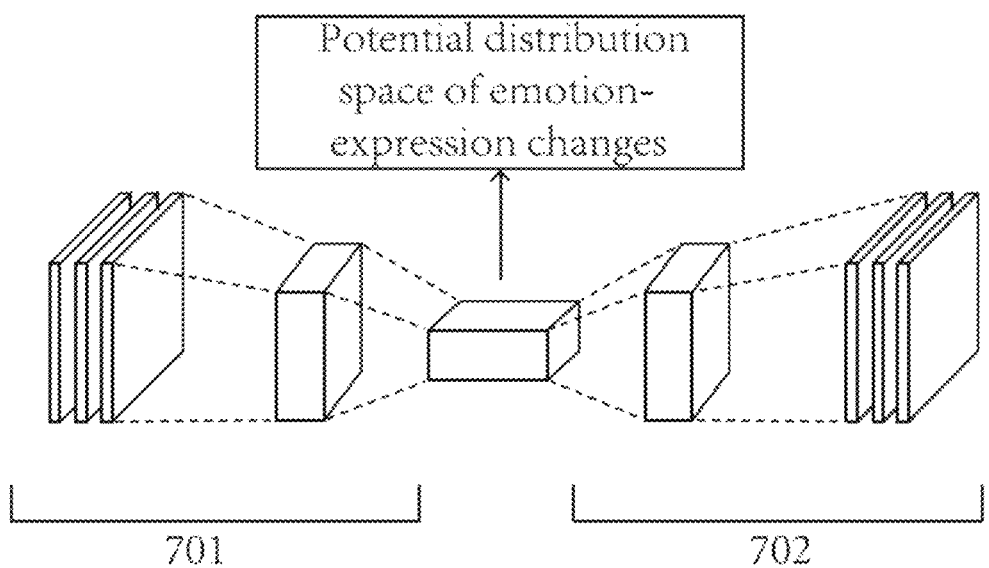
FIG. 8 is a schematic diagram of a potential space model based on deep learning in an emotional evolution method for a virtual avatar in educational metaverse according to an embodiment of the present disclosure.
Figure 9:
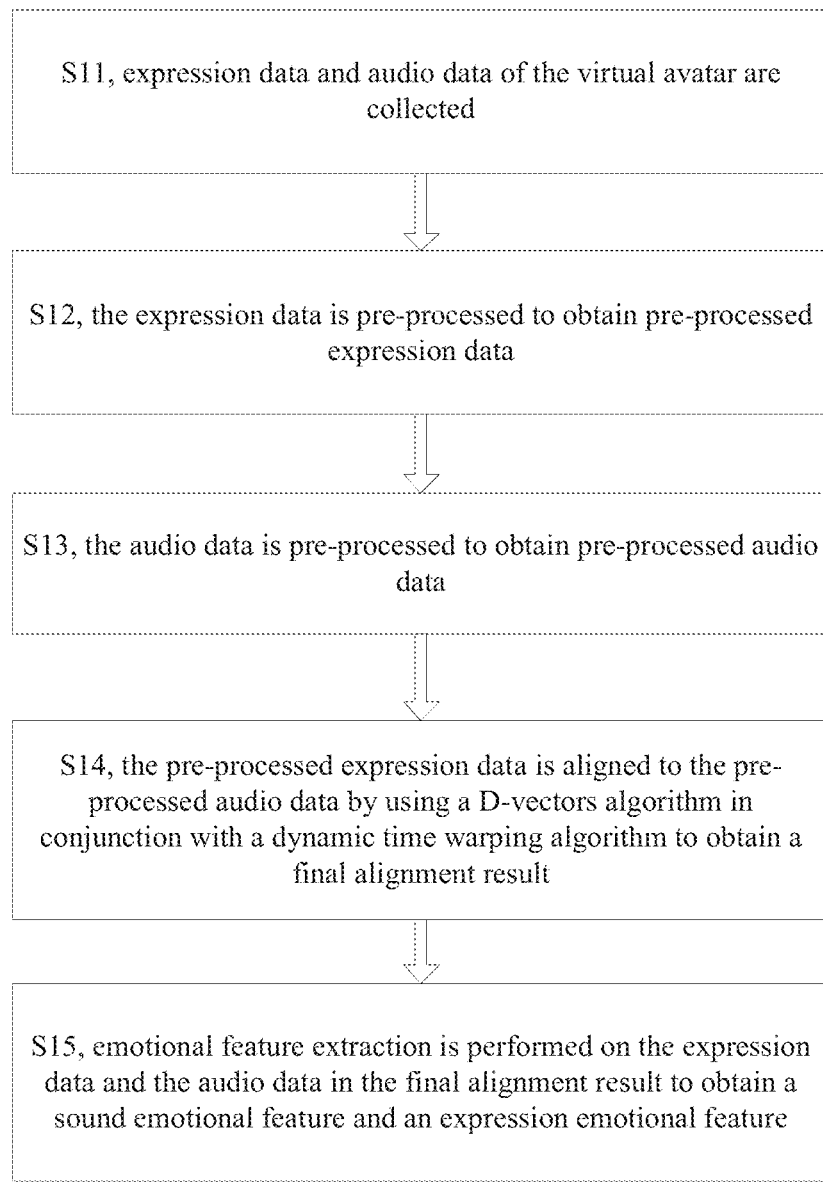
FIG. 9 is a flow diagram of steps of an emotional feature extraction according to an embodiment of the present disclosure.
Figure 10:
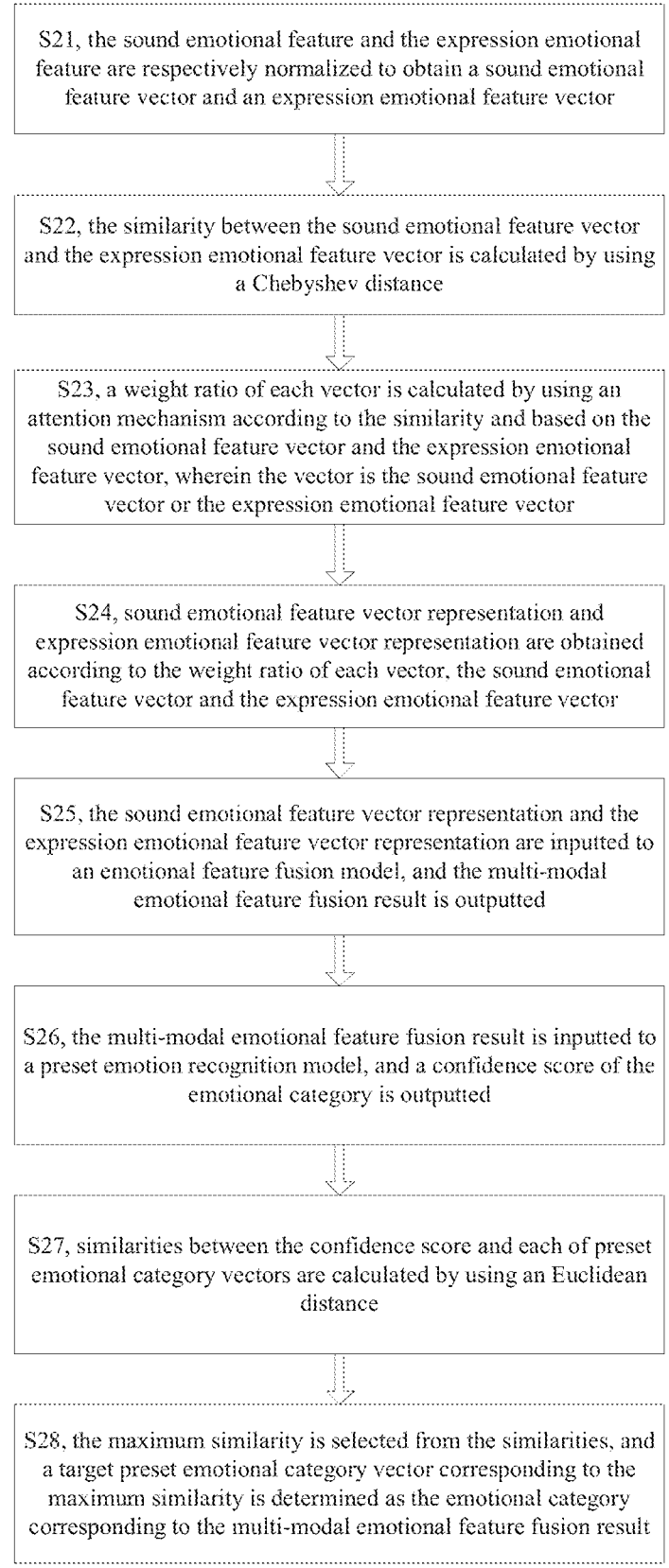
FIG. 10 is a flow diagram of steps of the multi-modal emotional feature and an emotional feature fusion according to an embodiment of the present disclosure.
Figure 12:
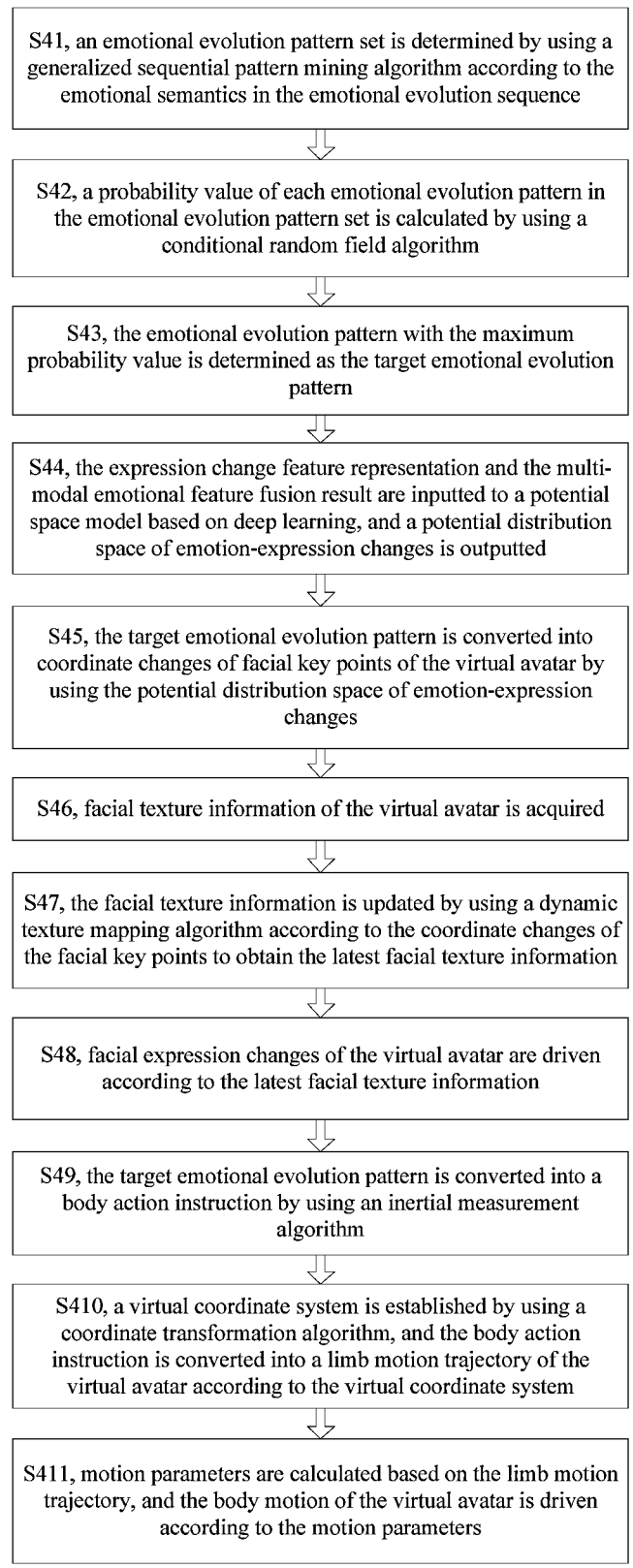
FIG. 12 is a flow diagram of steps of an emotional evolution of the virtual avatar according to an embodiment of the present disclosure.
Figure 14:
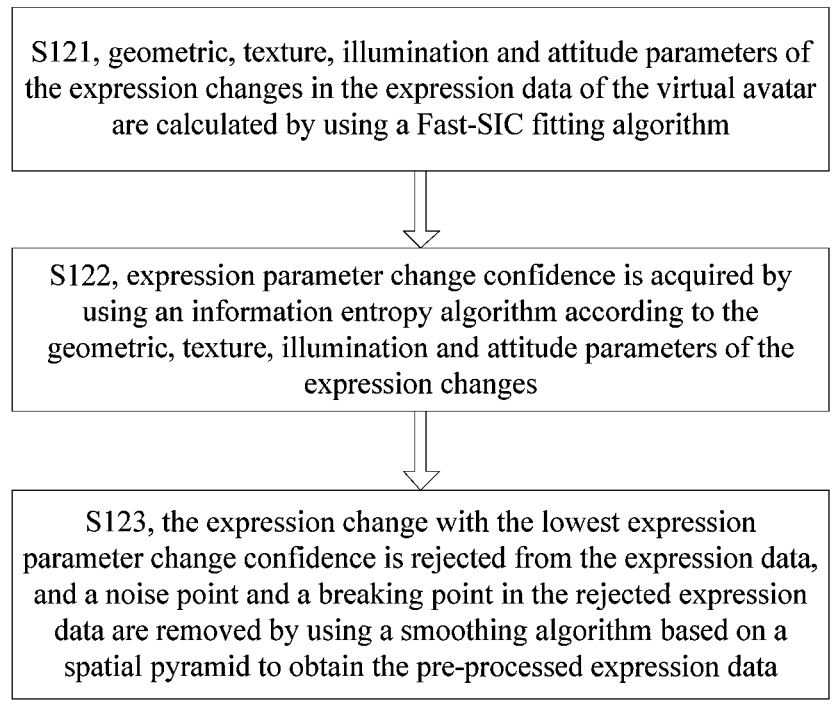
FIG. 14 is a flow diagram of the pre-processed steps of expression data according to an embodiment of the present disclosure.
Figure 15:
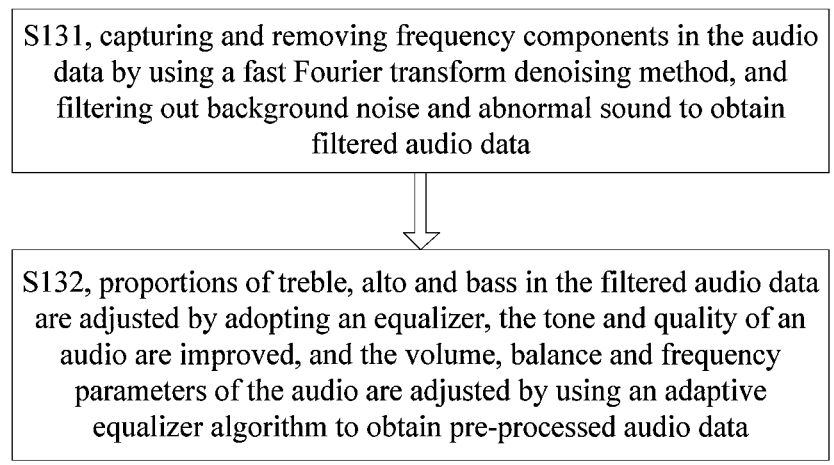
FIG. 15 is a flow diagram of the pre-processed steps of audio data according to an embodiment of the present disclosure.
Figure 16:
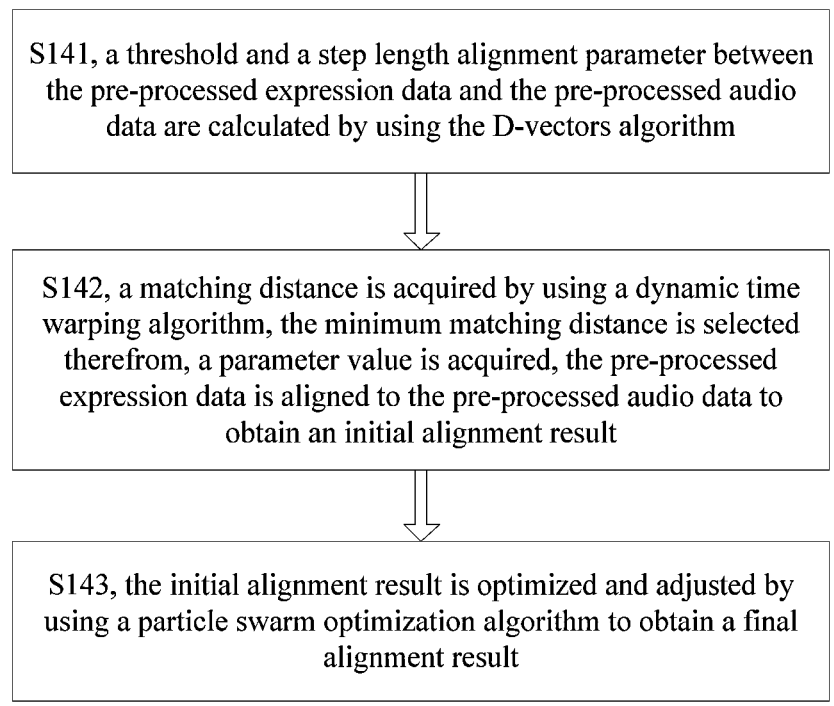
FIG. 16 is a flow diagram of steps of aligning the pre-processed expression data with the pre-processed audio data according to an embodiment of the present disclosure.
Figure 17:
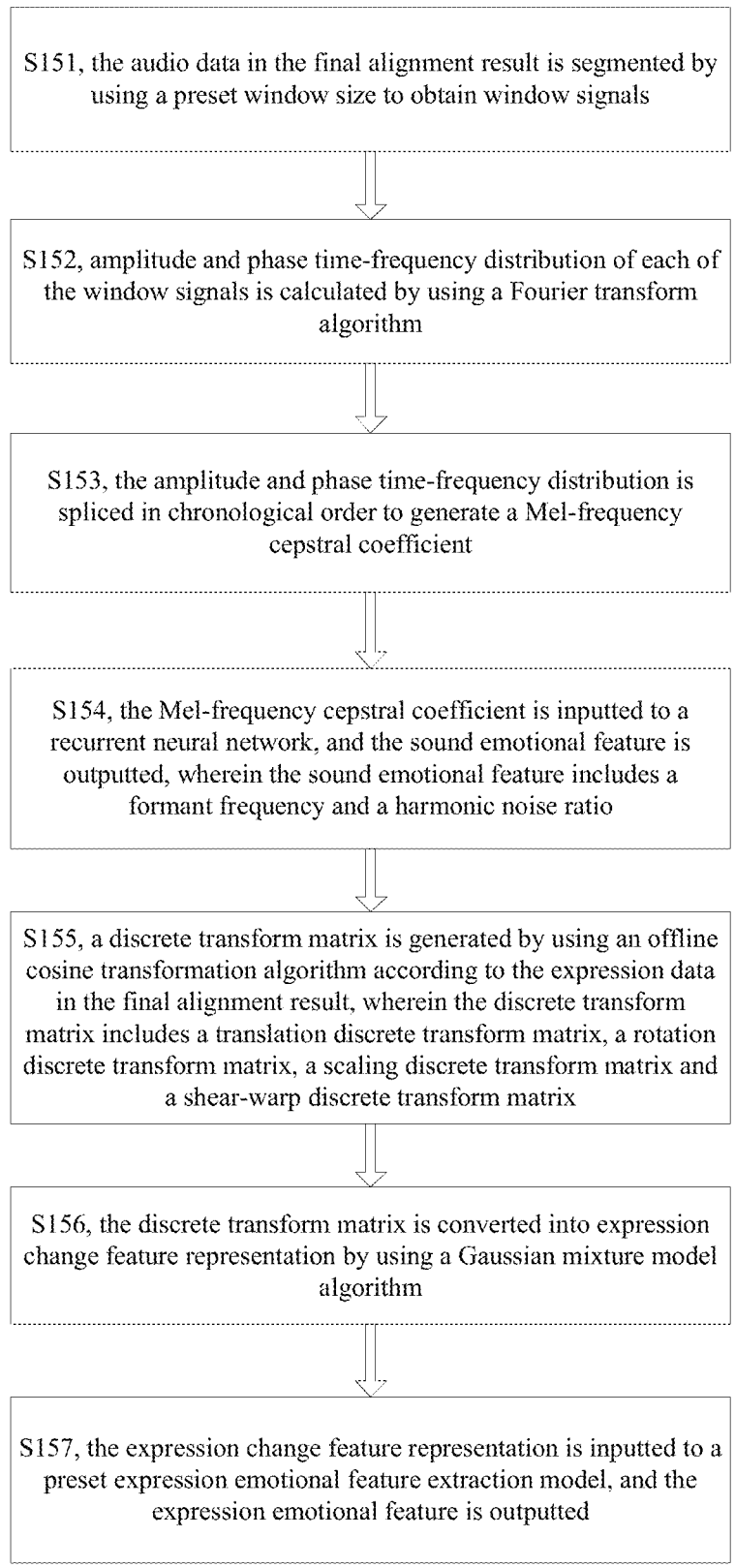
FIG. 17 is a flow diagram of steps of the emotional feature extraction according to an embodiment of the present disclosure.

S44, the expression change feature representation and the multi-modal emotional feature fusion result are inputted to a potential space model based on deep learning, as shown in FIG. 8, and a potential distribution space of emotion-expression changes is outputted;

701 in FIG. 8 is an emotional encoder in the potential space model based on deep learning, and 702 in FIG. 8 is an expression decoder in the potential space model based on deep learning.

S45, the target emotional evolution pattern is converted into coordinate changes of facial key points of the virtual avatar by using the potential distribution space of emotion-expression changes;

in an optional implementation, the coordinate changes of facial key points of the virtual avatar are coordinate changes of features of key point parts in regions such as the left eyebrow, the right eyebrow, the left eye, the right eye, the nose, the mouth and the jaw.

S46, facial texture information of the virtual avatar is acquired;

specifically, the facial texture information of the virtual avatar is extracted by using Gabor wavelet transformation.

S47, the facial texture information is updated by using a dynamic texture mapping algorithm according to the coordinate changes of the facial key points to obtain the latest facial texture information;

for example, the coordinate changes of the facial key points belong to the smiling expression change, the dynamic texture mapping algorithm specifically includes:

a smiling expression is changed, and position coordinates of the left eye of the virtual avatar are changed from $(x_{a0}, y_{a0}, z_{a0})$ to $(x_{a1}, y_{a1}, z_{a1})$;

(2) scaling degrees $s_x$, $s_y$ and $s_z$ and a translation distance T are calculated, specifically:

$$s_x = \frac{xa_1}{xa_0}, s_y = \frac{ya_1}{ya_0}, s_z = \frac{za_1}{za_0};$$

$$T = \begin{bmatrix} t_x \\ t_y \\ t_z \end{bmatrix} = \begin{bmatrix} xa_1 - xa_0 \\ ya_1 - ya_0 \\ za_1 - za_0 \end{bmatrix};$$

$t_x$ represents a translation distance from coordinates $x_{a0}$ to coordinates $x_{a1}$, ty represents a translation distance from coordinates $y_{a0}$ to coordinates $y_{a1}$, and $t_z$ represents a translation distance from coordinates $z_{a0}$ to coordinates $z_{a1}$;

(3) a texture transformation matrix M is constructed, specifically:

$$M = \begin{bmatrix} s_x & 0 & t_x \\ 0 & s_y & t_y \\ 0 & s_z & t_z \end{bmatrix};$$

(4) texture coordinates $$\begin{bmatrix} x \\ y \\ z \end{bmatrix}$$

are calculated, specifically:

$$\begin{bmatrix} x \\ y \\ z \end{bmatrix} = M \begin{bmatrix} xa_1 \\ ya_1 \\ za_1 \end{bmatrix};$$

and (5) the texture coordinates are used as parameters to be transferred to a red texture mapping unit of a graphics rendering pipeline, and a facial texture of the virtual avatar is updated to obtain the latest facial texture information.

S48, facial expression changes of the virtual avatar are driven according to the latest facial texture information;

specifically, a facial emotional feature change script of the virtual avatar is called to drive the facial expression changes of the virtual avatar according to the latest facial texture information.

S49, the target emotional evolution pattern is converted into a body action instruction by using an inertial measurement algorithm;

in an optional implementation, the body action instruction includes at least one of nodding, shaking head, tilting head, bending knees, necking, shrugging, waving arms, and moving footsteps.

S410, a virtual coordinate system is established by using a coordinate transformation algorithm, and the body action instruction is converted into a limb motion trajectory of the virtual avatar according to the virtual coordinate system; and S411, motion parameters are calculated based on the limb motion trajectory, and the body motion of the virtual avatar is driven according to the motion parameters.

The motion parameters include a joint angle, a speed and an accelerated speed;

specifically, the motion parameters including the joint angle, the speed and the accelerated speed are calculated based on the limb motion trajectory, and the body motion of the virtual avatar is driven according to the motion parameters including the joint angle, the speed and the accelerated speed.

Refer to FIG. 2, embodiment 2 of the present disclosure is described as follows.

Provided is an emotional evolution terminal for a virtual avatar in educational metaverse, including a memory, a processor, and a computer program stored on the memory and capable of running on the processor, the processor, when executing the computer program, implements each of the steps of the emotional evolution method for the virtual avatar in educational metaverse in embodiment 1.

In summary, the present disclosure provides an emotional evolution method and terminal for a virtual avatar in educational metaverse. By collecting expression data and audio data of the virtual avatar, and performing emotional feature extraction based on the expression data and the audio data; fusing an extracted sound emotional feature with an extracted expression emotional feature by using an emotional feature fusion model, and performing emotion recognition on a multi-modal emotional feature fusion result obtained by fusion to obtain an emotional category corresponding to the multi-modal emotional feature fusion result; labeling the multi-modal emotional feature fusion result based on a semantic vector of the emotional category to generate an emotional evolution sequence; and driving the virtual avatar to perform emotional expression according to a target emotional evolution pattern extracted from the emotional evolution sequence, compared with the prior art, its own data of the virtual avatar can be collected in real time, a unified and united multi-modal emotional feature fusion result can be formed, and the final emotional expression can be achieved in conjunction with semantic information of the emotional category, so that the emotional self-evolution of the virtual avatar is achieved, a more abundant and intelligent emotional expression form is provided for the virtual avatar, then, the emotional perception ability of the virtual avatar is improved, and more abundant and real emotional expression is achieved; and the semantic vector of the emotional category is obtained by using the emotional knowledge representation algorithm based on the neural network according to the labeled expression data and audio data as well as the positive and negative polarities and intensity value, and thus, the transfer and conversion relationships among the different emotional categories can be accurately described.

The above description is only intended to show the embodiments of the present disclosure, rather than to limit the patent scope of the present disclosure. All equivalent transformations made by utilizing the contents of the description and the accompanying drawings of the present disclosure are directly or indirectly applied to relevant technical fields, and also fall within the patent protection scope of the present disclosure.

What is claimed is:

1. An emotional evolution method for a virtual avatar in educational metaverse, comprising:

collecting expression data and audio data of the virtual avatar, and performing emotional feature extraction based on the expression data and the audio data to obtain a sound emotional feature and an expression emotional feature, wherein the expression data of the virtual avatar includes data associated with a facial expression of the virtual avatar, the facial expression of the virtual avatar including at least one of smiling, mouth opening, staring, mouth contraction, calming, and squinting;

fusing the sound emotional feature with the expression emotional feature by using an emotional feature fusion model to obtain a multi-modal emotional feature fusion result, and performing emotion recognition on the multi-modal emotional feature fusion result to obtain an emotional category corresponding to the multi-modal emotional feature fusion result;

determining a semantic vector of the emotional category, and labeling the multi-modal emotional feature fusion result based on the semantic vector of the emotional category to generate an emotional evolution sequence for the virtual avatar, wherein the emotional evolution sequence is an algorithm that enables the virtual avatar to change its facial expression in an intelligent teaching system; and extracting a target emotional evolution pattern from the emotional evolution sequence, and driving the virtual avatar to perform emotional expression according to the target emotional evolution pattern;

wherein fusing the sound emotional feature with the expression emotional feature by using the emotional feature fusion model to obtain the multi-modal emotional feature fusion result comprises:

respectively normalizing the sound emotional feature and the expression emotional feature to obtain a sound emotional feature vector and an expression emotional feature vector;

calculating the similarity between the sound emotional feature vector and the expression emotional feature vector by using a Chebyshev distance;

calculating a weight ratio of each vector by using an attention mechanism according to the similarity and based on the sound emotional feature vector and the expression emotional feature vector, wherein each vector is the sound emotional feature vector or the expression emotional feature vector;

obtaining sound emotional feature vector representation and expression emotional feature vector representation according to the weight ratio of each vector, the sound emotional feature vector and the expression emotional feature vector; and inputting the sound emotional feature vector representation and the expression emotional feature vector representation to the emotional feature fusion model, and outputting the multi-modal emotional feature fusion result, wherein labeling the multi-modal emotional feature fusion result based on the semantic vector of the emotional category to generate an emotional evolution sequence comprises:

labeling the multi-modal emotional feature fusion result by using the semantic vector of the emotional category to generate an emotional semantic sequence;

calculating fitness among different emotional semantics in the emotional semantic sequence by using a kernel function; and determining whether the fitness is lower than a preset fitness threshold, if yes, amending the emotional semantics corresponding to the fitness by using a semantic rewriting algorithm to obtain an amended emotional semantic sequence, and generating the emotional evolution sequence based on the amended emotional semantic sequence by using a time sequence analysis algorithm, and if not, generating the emotional evolution sequence based on the emotional semantic sequence by using the time sequence analysis algorithm.

2. The emotional evolution method according to claim 1, wherein performing emotional feature extraction based on the expression data and the audio data to obtain a sound emotional feature and an expression emotional feature comprises:

pre-processing the expression data to obtain pre-processed expression data;

pre-processing the audio data to obtain pre-processed audio data;

aligning the pre-processed expression data to the pre-processed audio data by using a D-vectors algorithm in conjunction with a dynamic time warping algorithm to obtain a final alignment result; and performing emotional feature extraction on the expression data and the audio data in the final alignment result to obtain the sound emotional feature and the expression emotional feature.

3. The emotional evolution method according to claim 2, wherein performing emotional feature extraction on the expression data and the audio data in the final alignment result to obtain the sound emotional feature and the expression emotional feature comprises:

segmenting the audio data in the final alignment result by using a preset window size to obtain window signals;

calculating amplitude and phase time-frequency distribution of each of the window signals by using a Fourier transform algorithm;

splicing the amplitude and phase time-frequency distribution in chronological order to generate a Mel-frequency cepstral coefficient;

inputting the Mel-frequency cepstral coefficient to a recurrent neural network, and outputting the sound emotional feature;

generating a discrete transform matrix by using an discrete cosine transformation algorithm according to the expression data in the final alignment result;

converting the discrete transform matrix into expression change feature representation by using a Gaussian mixture model algorithm; and inputting the expression change feature representation to a preset expression emotional feature extraction model, and outputting the expression emotional feature.

4. The emotional evolution method according to claim 3, wherein driving the virtual avatar to perform emotional expression according to the target emotional evolution pattern comprises:

inputting the expression change feature representation and the multi-modal emotional feature fusion result to a potential space model based on deep learning, and outputting a potential distribution space of emotion-expression changes;

converting the target emotional evolution pattern into coordinate changes of facial key points of the virtual avatar by using the potential distribution space of emotion-expression changes;

acquiring facial texture information of the virtual avatar;

updating the facial texture information by using a dynamic texture mapping algorithm according to the coordinate changes of the facial key points to obtain the latest facial texture information;

driving facial expression changes of the virtual avatar according to the latest facial texture information;

converting the target emotional evolution pattern into a body action instruction by using an inertial measurement algorithm;

establishing a virtual coordinate system by using a coordinate transformation algorithm, and converting the body action instruction into a limb motion trajectory of the virtual avatar according to the virtual coordinate system; and calculating motion parameters based on the limb motion trajectory, and driving the body motion of the virtual avatar according to the motion parameters.

5. The emotional evolution method according to claim 2, wherein determining a semantic vector of the emotional category comprises:

labeling the expression data and the audio data in the final alignment result by using the emotional category corresponding to the multi-modal emotional feature fusion result to obtain labeled expression data and audio data; and determining the positive and negative polarities and intensity value of the emotional category, and obtaining the semantic vector of the emotional category by using an emotional knowledge representation algorithm based on a neural network according to the labeled expression data and audio data as well as the positive and negative polarities and intensity value.

6. The emotional evolution method according to claim 1, wherein performing emotion recognition on the multi-modal emotional feature fusion result to obtain an emotional category corresponding to the multi-modal emotional feature fusion result comprises:

inputting the multi-modal emotional feature fusion result to a preset emotion recognition model, and outputting a confidence score of the emotional category;

calculating similarities between the confidence score and each of preset emotional category vectors by using an Euclidean distance; and selecting the maximum similarity from the similarities, and determining a target preset emotional category vector corresponding to the maximum similarity as the emotional category corresponding to the multi-modal emotional feature fusion result.

7. The emotional evolution method according to claim 1, wherein extracting a target emotional evolution pattern from the emotional evolution sequence comprises:

determining an emotional evolution pattern set by using a generalized sequential pattern mining algorithm according to the emotional semantics in the emotional evolution sequence;

calculating a probability value of each emotional evolution pattern in the emotional evolution pattern set by using a conditional random field algorithm; and determining the emotional evolution pattern with the maximum probability value as the target emotional evolution pattern.

8. An emotional evolution terminal for a virtual avatar in educational metaverse, comprising a memory, a processor, and a computer program stored on the memory and capable of running on the processor, wherein the processor, when executing the computer program, implements each of the steps of the emotional evolution method for the virtual avatar in educational metaverse of claim 1.

* * * * *